(12) United States Patent
Schlichter et al.

(10) Patent No.: US 11,760,890 B2
(45) Date of Patent: Sep. 19, 2023

(54) METHOD FOR THE ADDITIVE MANUFACTURING OF A SILICONE ELASTOMER ARTICLE

(71) Applicant: Elkem Silicones France SAS, Lyons (FR)

(72) Inventors: Karsten Schlichter, Francheville (FR); Jean-Marc Frances, Meyzieu (FR); Gerald Guichard, Givors (FR)

(73) Assignee: Elkem Silicones France SAS, Lyons (FR)

( * ) Notice: Subject to any disclaimer, the term of this patent is extended or adjusted under 35 U.S.C. 154(b) by 219 days.

(21) Appl. No.: 17/416,065

(22) PCT Filed: Dec. 20, 2019

(86) PCT No.: PCT/EP2019/086543
§ 371 (c)(1),
(2) Date: Jun. 18, 2021

(87) PCT Pub. No.: WO2020/127882
PCT Pub. Date: Jun. 25, 2020

(65) Prior Publication Data
US 2022/0186054 A1    Jun. 16, 2022

(30) Foreign Application Priority Data

Dec. 21, 2018  (EP) .................................... 18306823
Nov. 18, 2019  (EP) .................................... 19306479

(51) Int. Cl.
| | | |
|---|---|---|
| C09D 11/102 | (2014.01) | |
| B33Y 10/00 | (2015.01) | |
| B33Y 40/00 | (2020.01) | |
| B33Y 70/00 | (2020.01) | |
| B29C 64/40 | (2017.01) | |
| B29C 64/106 | (2017.01) | |
| C09D 11/037 | (2014.01) | |
| B29K 83/00 | (2006.01) | |
| B29K 509/02 | (2006.01) | |

(52) U.S. Cl.
CPC .......... C09D 11/102 (2013.01); B29C 64/106 (2017.08); B29C 64/40 (2017.08); B33Y 10/00 (2014.12); B33Y 40/00 (2014.12); B33Y 70/00 (2014.12); C09D 11/037 (2013.01); B29K 2083/00 (2013.01); B29K 2509/02 (2013.01)

(58) Field of Classification Search
CPC ..... B29C 64/40; B29C 64/112; B29C 64/295; B29C 64/106; B33Y 40/00; B33Y 70/00; B33Y 10/00
See application file for complete search history.

(56) References Cited

U.S. PATENT DOCUMENTS

| | | |
|---|---|---|
| 2015/0002852 A1 | 1/2015 | De Groot et al. |
| 2017/0251713 A1* | 9/2017 | Warner ................. A23P 30/20 |
| 2018/0036953 A1 | 2/2018 | Gottschalk |
| 2020/0108548 A1 | 4/2020 | Frances et al. |

FOREIGN PATENT DOCUMENTS

| | | |
|---|---|---|
| WO | 2018/053404 A1 | 3/2018 |
| WO | 2018/153467 A1 | 8/2018 |
| WO | 2018/206995 A1 | 11/2018 |

OTHER PUBLICATIONS

PCT International Search Report for PCT/EP2019/086543, dated Mar. 9, 2020.

* cited by examiner

*Primary Examiner* — Nahida Sultana
(74) *Attorney, Agent, or Firm* — MCBEE MOORE & VANIK IP, LLC; Susan McBee

(57) ABSTRACT

The invention relates to a method for the additive manufacturing of a silicone elastomer article. In particular, the invention relates to a method for the additive manufacturing of a silicone elastomer article and a support using a 3D printer.

17 Claims, No Drawings

METHOD FOR THE ADDITIVE MANUFACTURING OF A SILICONE ELASTOMER ARTICLE

CROSS-REFERENCE TO RELATED APPLICATIONS

This application is the National Stage entry of International Application No. PCT/EP2019/086543, filed 20 Dec. 2019, which claims priority to European Patent Application No. 18306823.8, filed 21 Dec. 2018, and European Patent Application No. 19306479.7, filed Nov. 18, 2019.

BACKGROUND

Field

The invention relates to a method for the additive manufacturing of a silicone elastomer article. In particular, the invention relates to a method for the additive manufacturing of a silicone elastomer article and a support using a 3D printer.

Description of Related Art

Additive manufacturing techniques covers different technologies whose common features is an automative additive buildup of layers of the shaped parts. Crosslinking silicone compositions have already been used in additive manufacturing methods to produce a three dimensional elastomer silicone article or part.

In order to print silicone elastomer articles having a complex shape, like a height of at least 5 cm, overhanging structures or cavities, it is sometimes necessary to use a support during the printing of the silicone composition.

US2015/0028523 discloses a method for printing a 3D part with an additive manufacturing system using a support material comprising a polyglycolic acid polymer. However, it is necessary to heat the support material at a very high temperature (more than 150° C.) to print it.

US20180036953 describes an additive manufacturing process of 3D mouldings using a supportive material composition comprising A) at least one polyether, B) at least one particulate rheological additive, and C) optionally other additional substances.

Nevertheless, this method requires the use of an organic solvent (polyether) and the composition does not seem to be reusable.

As these methods still have some drawbacks, there is a need to provide an improved method to 3D print silicone elastomer articles having complex shape.

Consequently, an essential objective of the present invention is to provide a method for the additive manufacturing of a silicone elastomer article having a complex shape.

Another essential objective of the present invention is to provide a method for the additive manufacturing of a silicone elastomer article, where silicone compositions having different viscosities can be used.

Another essential objective of the present invention is to provide a method for the additive manufacturing of a silicone elastomer article and a support.

Another essential objective of the present invention is to provide a method for the additive manufacturing of a silicone elastomer article and a support, where the support can be easily removed.

Another essential objective of the present invention is to provide a method for the additive manufacturing of a silicone elastomer article and a support, where the method is easy to implement.

Another essential objective of the present invention is to provide a method for the additive manufacturing of a silicone elastomer article and a support, where the support can be recycled.

Another essential objective of the present invention is to provide a support which could be used for the additive manufacturing of a silicone elastomer article.

SUMMARY

These objectives, among others, are achieved by the present invention which relates first to a method for the additive manufacturing of a silicone elastomer article and a support using a 3D printer, selected from an extrusion 3D printer and a 3D jetting printer, said method comprising the steps of:

1) printing at least one part of the support with a support material composition V;
2) printing at least one part of a crosslinkable silicone composition X precursor of the silicone elastomer article;

steps 1) and 2) being done simultaneously or successively, and when steps 1) and 2) are done successively, step 1) can be performed before step 2), or step 2) can be performed before step 1);

3) optionally repeating step 1) and/or step 2); and
4) allowing the crosslinkable silicone composition X precursor of the silicone elastomer article to crosslink, optionally by heating, to obtain a silicone elastomer article;

characterized in that said support material composition V comprises:
- between 3 wt. % and 30 wt. % of at least one nanoclay, and
- at least 50 wt. % of water, preferably demineralized or distilled water.

The support composition material V comprising a nanoclay and water has good thixotropic properties and is therefore useful in 3D printing. In particular, it avoids the collapse or deformation of the printed silicone composition. Silicone elastomer articles with a complex shape, like overhanging structures, can thus be printed using this method.

Moreover, the support material composition V can be easily removed, for example by dissolution in a solvent and/or mechanically. It is also possible to recover the support material composition V.

Another advantage of the support composition material V is its transparency. It is therefore possible to visualize the building of the silicone elastomer article and the transparent support.

The present invention also relates to the use of a support material composition V comprising:
- between 3 wt. % and 30 wt. % of at least one nanoclay, and
- at least 50 wt. % of water, for the 3D printing of a support, preferably by extrusion.

DETAILED DESCRIPTION

In the present disclosure, the symbols "wt. %" refer to a percentage by weight.

Method of Additive Manufacturing 3D printing is generally associated with a host of related technologies used to fabricate physical objects from computer generated, e.g. computer-aided design (CAD), data sources.

This disclosure generally incorporates ASTM Designation F2792-12a, "Standard Terminology for Additive Manufacturing Technologies".

"3D printer" is defined as "a machine used for 3D printing" and "3D printing" is defined as "the fabrication of objects through the deposition of a material using a print head, nozzle, or another printer technology."

"Additive manufacturing (AM)" is defined as "a process of joining materials to make objects from 3D model data, usually layer upon layer, as opposed to subtractive manufacturing methodologies. Synonyms associated with and encompassed by 3D printing include additive fabrication, additive processes, additive techniques, additive layer manufacturing, layer manufacturing, and freeform fabrication." Additive manufacturing (AM) may also be referred to as rapid prototyping (RP). As used herein, "3D printing" is generally interchangeable with "additive manufacturing" and vice versa.

"Printing" is defined as depositing of a material, here a crosslinkable silicone composition or a support material composition, using a print head, nozzle, or another printer technology.

In this disclosure "3D or three dimensional article, object or part" means an article, object or part obtained by additive manufacturing or 3D printing as disclosed above.

In general, all 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed from scratch.

The computer generated data source or program is typically converted into a standard tessellation language (STL) file format; however other file formats can also or additionally be used. The file is generally read into 3D printing software, which takes the file and optionally user input to separate it into hundreds, thousands, or even millions of "slices." The 3D printing software typically outputs machine instructions, which may be in the form of G-code, which is read by the 3D printer to build each slice of the support and of the precursor of the silicone elastomer article. The machine instructions are transferred to the 3D printer, which then builds the objects (support and precursor of the silicone elastomer article), layer by layer, based on this slice information in the form of machine instructions. Thicknesses of these slices may vary.

Typically, the 3D printer utilizes a dispenser, e.g. a nozzle or print head, for printing the crosslinkable silicone composition X precursor of the silicone elastomer article and another dispenser for printing the support composition material V. Optionally, the dispensers may be heated before, during, and after dispensing the crosslinkable silicone composition X precursor of the silicone elastomer article and/or the support composition material V. More than one dispenser may be utilized with each dispenser having independently selected properties.

An extrusion 3D printer is a 3D printer where the material is extruded through a nozzle, syringe or orifice during the additive manufacturing process. The 3D printer can have one or more nozzle, syringe or orifice. Preferably, the 3D printer has at least 2 nozzles, syringes or orifices for the additive manufacturing process.

Material extrusion generally works by extruding material through a nozzle, syringe or orifice to print one cross-section of an object, which may be repeated for each subsequent layer. The extruded material bonds to the layer below it during cure of the material.

Advantageously, the crosslinkable silicone composition X precursor of the silicone elastomer article is extruded through a nozzle and the support composition V is extruded through another nozzle. The nozzles may be heated to aid in dispensing the crosslinkable silicone composition X precursor of the silicone elastomer article or the support material composition V.

The average diameter of the nozzle defines the thickness of the layer. In an embodiment, the diameter of the nozzle is comprised from 50 to 2,000 µm, preferably from 100 to 800 µm and most preferably from 100 to 500 µm.

The distance between the nozzle and the substrate is an important parameter to assure good shape. Preferably it is comprised from 70 to 200%, more preferably from 80 to 120% of the nozzle average diameter.

The crosslinkable silicone composition X precursor of the silicone elastomer article and the support material composition V to be dispensed through the nozzles may be supplied from cartridge-like systems. The cartridges may include a nozzle or nozzles with an associated fluid reservoir or fluids reservoirs. It is also possible to use a coaxial two cartridges system with a static mixer and only one nozzle. This is especially useful when the crosslinkable silicone composition X precursor of the silicone elastomer article is a multi-part composition.

Pressure will be adapted to the fluid to be dispensed, the associated nozzle average diameter and the printing speed.

Because of the high shear rate occurring during the nozzle extrusion, the viscosity of the crosslinkable silicone composition X precursor of the silicone elastomer article and the support material composition V are greatly lowered and so permit the printing of fine layers.

Cartridge pressure could vary from 1 to 28 bars, preferably from 2 to 25 bars and most preferably from 4 to 8 bars. When nozzle diameters lower than 100 µm are used, cartridge pressure shall be higher than 20 bars to get good material extrusion. An adapted equipment using aluminum cartridges shall be used to resist such a pressure.

The nozzle and/or build platform moves in the X-Y (horizontal plane) to complete the cross section of the object, before moving in the Z axis (vertical) plane once one layer is complete. The nozzle has a high XYZ movement precision around 10 µm. After each layer is printed in the X, Y work plane, the nozzle is displaced in the Z direction only far enough that the next layer can be applied in the X, Y work place. In this way, the objects which become the support or the precursor of the silicone elastomer article can be built one layer at a time from the bottom upwards.

As disclosed before, the distance between the nozzle and the previous layer is an important parameter to assure good shape. Preferably, it should be comprised from 70 to 200%, preferably from 80 to 120% of the nozzle average diameter.

Advantageously, printing speed is comprised between 1 and 100 mm/s, preferably between 3 and 50 mm/s to obtain the best compromise between good accuracy and manufacture speed.

"Material jetting" is defined as "an additive manufacturing process in which droplets of build material are selectively deposited". The material is applied with the aid of a printing head in the form of individual droplets, discontinuously, at the desired location of the work plane (Jetting). 3D apparatus and a process for the step-by-step production of 3D structures with a printing head arrangement comprising at least one, preferably 2 to 200 printing head nozzles, allowing the site-selective application where appropriate of a plurality of materials. The application of the materials by means of inkjet printing imposes specific requirements on the viscosity of the materials.

In a 3D jetting printer one or a plurality of reservoirs are subject to pressure and being connected via a metering line to a metering nozzle. Upstream or downstream of the reservoir there may be devices which make it possible for multicomponent silicone compositions to be homogeneously mixed and/or to evacuate dissolved gases. One or a plurality of jetting apparatuses operating independently of one another may be present, to construct the support and the precursor of the silicone elastomer article, to construct the precursor of the silicone elastomer article from different silicone compositions, or, in the case of more complex structures, to permit composite parts made from silicone elastomers and other plastics.

Because of the high shear rate occurring in the metering valve during the jetting metering procedure, the viscosity of such silicone compositions and support material composition is greatly lowered and so permits the jetting metering of very fine microdroplets. After the microdrop has been deposited on the substrate, there is a sudden reduction in its shear rate, and so its viscosity climbs again. Because of this, the deposited drop rapidly becomes of high viscosity again and permits the shape-precise construction of three-dimensional structures.

The individual metering nozzles can be positioned accurately in x-, y-, and z-directions to permit precisely targeted deposition of the crosslinkable silicone composition drops and the support material composition drops on the substrate or, in the subsequent course of formation of shaped parts, on the precursor of the silicone elastomer article or on the support, which has already been placed.

In a preferred embodiment of the method, the method for additive manufacturing a three-dimensional silicone elastomer article uses an extrusion 3D printer.

In an embodiment of the method, the method for additive manufacturing a three-dimensional silicone elastomer article uses an extrusion 3D printer comprising (i) at least one dispenser, e.g. a nozzle or print head, for printing the crosslinkable silicone composition X precursor of the silicone elastomer article, and (ii) at least one dispenser for printing the support composition material V.

In an embodiment of the method, the method for additive manufacturing a three-dimensional silicone elastomer article uses an extrusion 3D printer comprising (i) at least a nozzle for printing the crosslinkable silicone composition X precursor of the silicone elastomer article, and (ii) at least a nozzle for printing the support composition material V, the diameter of each nozzle being comprised from 50 to 2,000 µm, preferably from 100 to 800 µm and most preferably from 100 to 500 µm.

In an embodiment of the method, the method for additive manufacturing a three-dimensional silicone elastomer article uses an extrusion 3D printer comprising (i) at least one cartridge comprising the support material composition V to be dispensed through a nozzle, and (ii) at least one cartridge comprising the crosslinkable silicone composition X precursor of the silicone elastomer article to be dispensed through a nozzle, the diameter of each nozzle being comprised from 50 to 2,000 µm, preferably from 100 to 800 µm and most preferably from 100 to 500 µm, and the cartridge pressure being preferably comprised from 1 to 28 bars.

Contrary to other additive manufacturing methods, the method does not need to be carried out in an irradiated or heated environment to initiate the curing after each layer is printed to avoid the collapse of the structure.

The printing steps 1) and 2) can be performed simultaneously or successively.

When they are performed simultaneously, part(s) of the support and part(s) of the precursor of the silicone elastomer article are printed at the same time.

When they are performed successively, step 1) can be performed before step 2), so that part(s) of the support is printed first, and then part(s) of the precursor of the silicone elastomer article is printed; or, step 2) can be performed before step 1), so that part(s) of the precursor of the silicone elastomer article is printed first, and then part(s) of the support is printed.

Steps 1) and/or 2) can be repeated several times. Each time these steps are repeated, they can be performed simultaneously or successively.

For example, first part(s) of the support is printed, then part(s) of the precursor of the silicone elastomer article is printed, and finally part(s) of the support and part(s) of the precursor of the silicone elastomer article are printed simultaneously.

The printing steps 1) and 2) can be performed at room temperature or by heating. For example the printing steps 1) and 2) can be performed at a temperature comprised between 25 and 90° C., preferably at a temperature comprised between 25 and 80° C.

The crosslinking step 4) can be performed at room temperature or by heating. Advantageously, the crosslinking step 4) is performed at room temperature or by heating at a temperature less than or equal to 40° C., preferably for a period from 10 min to 24 hours. This crosslinking step can be performed several times. In an embodiment, step 4) is a step of heating the crosslinkable silicone composition X precursor of the silicone elastomer article. Heating can be used to expedite cure. In another embodiment, step 4) is a step of irradiating the crosslinkable silicone composition X precursor of the silicone elastomer article, the irradiation can be performed with UV light. Further irradiation can be used to expedite cure. In another embodiment, step 4) comprises both heating and irradiating the crosslinkable silicone composition X precursor of the silicone elastomer article.

The method can further comprise a step of removal of the support. The support can be removed mechanically, for example by brushing the printed object or by blowing the printed object with dried air, preferably in a room with recovery of dust of the support.

The support can also be removed by dissolution in a solvent, preferably in water, and more preferably by immersion in a stirred water bath (demineralized water, or in acidic conditions, or using a dispersing agent).

The support can also be removed mechanically and by dissolution in a solvent, for example using a combination of solvent and ultrasounds.

The removal step can be performed before and/or after the crosslinking step 4). According to an embodiment of the method, a first crosslinking step 4) is performed, by letting the crosslinkable silicone composition X precursor of the silicone elastomer article crosslink at room temperature or by heating the crosslinkable silicone composition X precursor of the silicone elastomer article at a temperature less than or equal to 40° C., preferably for a period from 10 min to 24 hours, then the support is removed mechanically and/or by dissolution in a solvent, and then another crosslinking step 4) is performed, by heating the crosslinkable silicone composition X precursor of the silicone elastomer article at a temperature between 25° C. and 250° C., preferably between 30° C. and 200° C., to complete the crosslinking.

It is possible to recycle the support composition material V. When the support is removed mechanically, the nanoclay can be collected, lyophilized and used again. After dissolution of the support in a solvent such as water or water with dispersant additive, it is possible to recover a concentrated solution of nanoclay by evaporation of the water.

Post-Process Options

Optionally, post-processing steps can greatly improve the surface quality of the printed articles. Sanding is a common way to reduce or remove the visibly distinct layers of the model. Spraying or coating the surface of the silicone elastomer article with a heat or UV curable RTV or LSR crosslinkable silicone composition can be used to get the right smooth surface aspect.

A surfacing treatment with a laser can also be done.

For medical applications, a sterilization of the final elastomer article can be obtained for example: by heating either in a dry atmosphere or in an autoclave with vapor, for example by heating the object at a temperature greater than 100° C., under gamma ray, sterilization with ethylene oxide, sterilization with an electron beam.

The obtained silicone elastomer article can be any article with simple or complex geometry. It can be for example anatomic models (functional or non functional) such as heart, limb, kidney, prostate, . . . , models for surgeons and educative world or orthotics or prostheses or even implants of different classes such as long term implants: hearing aids, stents, larynx implants, etc.

The obtained silicone elastomer article can also be an actuator for robotics, a gasket, a mechanical piece for automotive/aeronautics, a piece for electronic devices, a package for the encapsulation of components, a vibrational isolator, an impact isolator or a noise isolator.

Support Material Composition V

The support material composition V comprises:

between 3 wt. % and 30 wt. % of at least one nanoclay, and at least 50 wt. % of water, preferably demineralized or distilled water.

As used herein, the term "nanoclay" refers to nanoparticles of layered mineral silicates. Nanoparticles of layered mineral silicates are particles having at least one average individual dimension below or equal to 1 micron, preferably at least one individual dimension below or equal to 100 nm. Furthermore, it is known that the nanoparticles of layered mineral silicates can form aggregates, which can have a size of several microns.

Depending on chemical composition and nanoparticle morphology, nanoclays are organized into several classes. Advantageously, nanoclays are phyllosilicates having a layered structure composed of tetrahedral sheets (T) and octahedral sheets (O). They can have the following structures:

a TO (or 1:1) structure where each layer is formed by one tetrahedral sheet (T) and one octahedral sheet (O), like the group of kaolin-serpentines, a TOT (or 2:1) structure where each layer is formed by one octahedral sheet (O) merged between two tetrahedral sheets (T), like the groups of smectites and bentonites, or a TOT:O (or 2:1:1) structure where each layer is formed by one octahedral sheet (O) adjacent to one octahedral sheet (O) merged between two tetrahedral sheets (T), like the group of chlorites.

Preferably, the nanoclay is selected from:

kaolin-serpentines, preferably selected from the group consisting of halloysite and kaolinite;

smectites, preferably selected from the group consisting of montmorillonite, hectorite and laponite;

bentonites; and mixtures thereof.

The nanoclay may be selected from kaolin-serpentines, preferably from the group consisting of halloysite, kaolinite and mixtures thereof. The nanoclay may also be selected from the group consisting of smectites, bentonites and mixtures thereof.

Advantageously, the nanoclay is selected from smectites, preferably from the group consisting of saponite, hectorite, sauconite, stevensite, swinefordite, montmorillonite, beidellite, nontronite, volkonskoite fluorohactite, laponite and mixtures thereof. The nanoclay may also be selected from the group consisting of montmorillonite, hectorite and mixtures thereof.

More preferably, the nanoclay is laponite. Laponite is a silicic acid, lithium magnesium sodium salt, which can have the following empirical formula: $Na^+_{0.7}[(Si_8Mg_{5.5}Li_{0.3})O_{20}(OH)_4]^{-0.7}$. Laponite is a synthetic hectorite.

According to an embodiment, the nanoclay is selected from the group consisting of hectorite, laponite, and mixtures thereof. Examples of hectorite include the ones commercialized under the name Hatorite.

According to an embodiment, the support material composition V comprises:

between 3 wt. % and 30 wt. % of at least one nanoclay, preferably between 3 and 16 wt. %, more preferably between 3.5 and 16 wt. %, at least 50 wt. % of water, preferably demineralized or distilled water, preferably between 50 and 97 wt. %, and between 0 and 47 wt. % of at least one additive, preferably between 0 and 20 wt. %.

The water used in the support material composition V is preferably demineralized or distilled.

According to an embodiment, the support material composition V comprises between 3 and 16 wt. % of at least one nanoclay, preferably between 3.5 and 16 wt. %, more preferably between 4 and 12 wt. %, and even more preferably between 4 and 10 wt. %.

According to an embodiment, the support material composition V comprises at least 60 wt. % of water, preferably at least 70 wt. %, and more preferably at least 80 wt. %. The support material composition V may comprise between 50 and 97 wt. % of water, preferably between 70 and 97 wt. %, and more preferably between 80 and 96 wt. %.

According to an embodiment, the support material composition V comprises between 3 and 16 wt. % of at least one nanoclay, preferably between 3.5 and 16 wt. %, more preferably between 4 and 12 wt. %, and even more preferably between 4 and 10 wt. %, and between 50 and 97 wt. % of water, preferably between 70 and 97 wt. %, and more preferably between 80 and 96 wt. %.

According to an embodiment, the support material composition V consists of
- between 3 wt. % and 30 wt. % of at least one nanoclay, and
- between 70 and 97 wt. % of water.

According to another embodiment, the support material composition V consists of
- between 3 wt. % and 16 wt. % of at least one nanoclay, and
- between 84 and 97 wt. % of water.

Advantageously, the support material composition has thixotropic properties. The support material composition V can have the following rheological characteristics: a low viscosity at high shear rate, and a high viscosity at low shear rate. The shear rate is the rate at which a fluid is sheared during flow. The viscosities of the support material composition V are measured at 25° C., using a Haake MARS rheometer (cone-plate of 2° and diameter of 20 mm at 25° C., GAP=100 μm). Preferably, the support material composition V has a viscosity less than or equal to 500 Pa·s at a shear rate of 10 s$^{-1}$, and a viscosity more than or equal to 500 Pa·s at a shear rate of 0.01 s$^{-1}$.

The support material composition V can have a viscosity less than or equal to 250 Pa·s at a shear rate of 10 s$^{-1}$. Preferably, the viscosity of the support material composition V is comprised between 3 Pa·s and 500 Pa·s, preferably between 9 and 250 Pa·s at a shear rate of 10 s$^{-1}$.

The support material composition V can have a viscosity more than or equal to 1,000 Pa·s at a shear rate of 0.01 s$^{-1}$. Preferably, the viscosity of the support material composition V is comprised between 500 Pa·s and 200,000 Pa·s, preferably between 1,000 Pa·s and 100,000 Pa·s at a shear rate of 0.01 s$^{-1}$.

A viscosity less than or equal to 500 Pa·s at a shear rate of 10 s$^{-1}$ indicates that, under shear stress, the support material composition V behaves like a fluid, and it is thus possible to print it. A viscosity more than or equal to 500 Pa·s at a shear rate of 0.01 s$^{-1}$ indicates that, under low or no shear stress, the support material composition V behaves like a gel, and can therefore be used as a support for the crosslinkable silicone composition X precursor of the silicone elastomer article. Consequently, the support material composition V has good thixotropic properties which are compatible with 3D printing.

Moreover, after stopping the shear stress, the viscosity of the support material composition V rapidly increases back to a high value, which makes it possible to rapidly print another layer of the support material composition V or of the crosslinkable silicone composition X precursor of the silicone elastomer article on top of it. The viscosity of the support material composition V can be more than or equal to 500 Pa·s at a shear rate of 0.01 s$^{-1}$, 90 seconds after stopping a shear stress of 20 s$^{-1}$.

The support material composition V can further comprise at least one additive selected from:
- rheology additive,
- coloration agents;
- pH adjusters;
- antimicrobial agents;
- dispersing agents,
- and mixtures thereof.

The rheology additives can be used to modify the rheological properties of the support material composition V. Rheology additives that act as viscosity modifiers are especially useful in the present invention. Examples of rheology additives that act as viscosity modifiers include:
- hydrosoluble or hydrodispersible polymers, which can be selected from polysaccharides like cellulose, xanthane gum, guar gum, and alginates; cellulose ethers like carboxymethyl cellulose; polymers based on acrylic acid (carbomer); poloxamers; polyethylene oxide; and mixtures thereof, and
- protein or peptides, which can be selected from collagen, fibrin, gelatin and mixtures thereof.

In a specific embodiment, the support material composition V further comprises a hydrosoluble or hydrodispersible polymer, preferably a gelling polymer. The gelling polymer can be a thermoresponsive polymer which can form hydrogels.

The hydrosoluble or hydrodispersible polymer is preferably selected from polysaccharides like cellulose, xanthane gum, guar gum, and alginates; cellulose ethers like carboxymethyl cellulose; polymers based on acrylic acid (carbomer); poloxamers; polyethylene oxide; and mixtures thereof.

Advantageously, the support material composition V further comprises a poloxamer Examples of poloxamer include the ones commercialized under the name Pluronic®, like Pluronic 127.

In a specific embodiment, the support material composition V further comprises more than 0.1 wt. % of a hydrosoluble or hydrodispersible polymer, preferably between 0.1 and 25 wt. %, more preferably between 1 and 20 wt. %, and even more preferably between 5 and 15 wt. %.

Coloration agents can be used to color the support material composition V, which is generally transparent if no colouring agents are used. Examples of colouring agents include organic or inorganic pigments and dyes.

pH adjusters are used to modify or stabilize the pH of the support material composition V. The pH adjuster can be a buffer solution, a base or an acid.

Examples of buffer solution include carbonate buffers, like citric acid or lactic acid buffers, borate buffers, phosphate buffers and sulfate buffers.

Examples of base that can be used in the present invention include sodium hydroxide, sodium metasilicate, ammonium solutions, primary amines, like 2-amino-2-methyl-1-propanol, secondary amines, or tertiary amines, like dimethylethanolamine or triethanolamine.

Antimicrobial agents include antibacterial and antifungal agents.

The dispersing agents facilitate the dispersion of the clay, they can be used to obtain a concentrated solution of nanoclay. Examples of dispersing agents include condensed phosphates like tetrasodium pyrophosphates, glycols, silicone based dispersing agents, for example silicone based dispersing agents commercialized under the name Silcolapse®, and some non-ionic surfactants.

According to a specific embodiment, the support material composition V further comprises a dispersing agent at a content less than 2 wt. %, preferably less than 1 wt. %, and more preferably between 0.001 and 0.1 wt. %.

According to an embodiment, the support material composition V further comprises:
- between 1 and 20% of a hydrosoluble or hydrodispersible polymer, typically a poloxamer, and
- optionally between 0.001 and 0.1 wt. %. of a dispersing agent, typically a silicone based dispersing agent.

According to a specific embodiment, the support material composition V comprises
- between 3 wt. % and 30 wt. % of at least one nanoclay, preferably between 3 and 16 wt. %, more preferably between 3.5 and 16 wt. %, at least 50 wt. % of water, preferably demineralized or distilled water, preferably between 50 and 97 wt. %, between 1 and 20% of a hydrosoluble or hydrodispersible polymer, typically a poloxamer, and optionally between 0.001 and 0.1 wt. %. of a dispersing agent, typically a silicone based dispersing agent.

Use of the Support Material Composition V

The present invention also relates to the use of a support material composition V comprising:

between 3 wt. % and 30 wt. % of at least one nanoclay, and at least 50 wt. % of water, for the 3D printing of a support, preferably by extrusion.

The support material composition V is the one described herein. Preferably, the support material composition V comprises between 3 and 16 wt. %, preferably between 3.5 and 16 wt. %, more preferably between 4 and 12 wt. %, and even more preferably between 4 and 10 wt. % of at least one nanoclay, and between 50 and 97 wt. % of water, preferably between 70 and 97 wt. %, and more preferably between 80 and 96 wt. %.

The 3D printing of the support is preferably done using an extrusion 3D printer comprising (i) at least one dispenser for printing the support composition material V. In an embodiment, the extrusion 3D printer comprises (i) at least a nozzle for printing the support composition material V, the diameter of each nozzle being comprised from 50 to 2,000 µm, preferably from 100 to 800 µm and most preferably from 100 to 500 µm.

The present invention also relates to the use of a support material composition V comprising:

between 3 wt. % and 30 wt. % of at least one nanoclay, and at least 50 wt. % of water, for the additive manufacturing of a silicone elastomer article and a support using a 3D printer, preferably an extrusion 3D printer.

The support material composition V is the one described herein. Preferably, the support material composition V comprises between 3 and 16 wt. %, preferably between 3.5 and 16 wt. %, more preferably between 4 and 12 wt. %, and even more preferably between 4 and 10 wt. % of at least one nanoclay, and between 50 and 97 wt. % of water, preferably between 70 and 97 wt. %, and more preferably between 80 and 96 wt. %.

The support material composition V can further comprise:

between 1 and 20% of a hydrosoluble or hydrodispersible polymer, typically a poloxamer, and optionally between 0.001 and 0.1 wt. %. of a dispersing agent, typically a silicone based dispersing agent.

In an embodiment, the 3D printer is an extrusion 3D printer comprising (i) at least one dispenser, e.g. a nozzle or print head, for printing the crosslinkable silicone composition X precursor of the silicone elastomer article, and (ii) at least one dispenser for printing the support composition material V.

In an embodiment, the extrusion 3D printer comprises (i) at least a nozzle for printing the crosslinkable silicone composition X precursor of the silicone elastomer article, and (ii) at least a nozzle for printing the support composition material V, the diameter of each nozzle being comprised from 50 to 2,000 µm, preferably from 100 to 800 µm and most preferably from 100 to 500 µm.

In an embodiment of the method, the method for additive manufacturing a three-dimensional silicone elastomer article uses an extrusion 3D printer comprising (i) at least one cartridge comprising the support material composition V to be dispensed through a nozzle, and (ii) at least one cartridge comprising the crosslinkable silicone composition X precursor of the silicone elastomer article to be dispensed through a nozzle, the diameter of each nozzle being comprised from 50 to 2,000 µm, preferably from 100 to 800 µm and most preferably from 100 to 500 µm, and the cartridge pressure being preferably comprised from 1 to 28 bars.

Crosslinkable Silicone Composition X

The crosslinkable silicone composition X precursor of the silicone elastomer article can be a silicone composition crosslinkable via polyaddition reaction or via polycondensation reaction.

In the process according to the invention, the crosslinkable silicone composition X precursor of the silicone elastomer article is a crosslinkable silicone composition having preferably a viscosity comprised between 1,000 mPa·s and 10,000,000 mPa·s. The process according to the invention is especially adapted to print a crosslinkable silicone composition X precursor of the silicone elastomer article having a viscosity lower than 50,000 mPa·s, preferably lower than 10,000 mPa·s, for example comprised between 1,000 to 5,000 mPa·s. The use of the support material composition V as described herein allows the printing of silicone compositions having different viscosities, for example silicone compositions having low viscosities.

The viscosities of the silicone compositions and their individual constituents described herein correspond to a "Newtonian" dynamic viscosity magnitude at 25° C., i.e. the dynamic viscosity which is measured, in a manner that is known per se, with a Brookfield viscometer at a shear rate gradient that is low enough for the measured viscosity to be independent of the rate gradient.

In one embodiment, the crosslinkable silicone composition X precursor of the silicone elastomer article is a silicone composition crosslinkable via polyaddition. In this embodiment, the composition X comprises:

(A) at least one organopolysiloxane compound A comprising, per molecule at least two $C_2$-$C_6$ alkenyl radicals bonded to silicon atoms, (B) at least one organohydrogenopolysiloxane compound B comprising, per molecule, at least two hydrogen atoms bonded to an identical or different silicon atom, (C) at least one catalyst C consisting of at least one metal or compound, from the platinum group, (D) optionally at least one filler D, (E) optionally at least thixotropic agent E, and (F) optionally at least one crosslinking inhibitor F.

Organopolysiloxane A

According to a particularly advantageous mode, the organopolysiloxane A comprising, per molecule, at least two $C_2$-$C_6$ alkenyl radicals bonded to silicon atoms, comprises:

(i) at least two siloxyl units (A.1), which may be identical or different, having the following formula:

$$W_a Z_b SiO_{\frac{4-(a+b)}{2}} \quad (A.1)$$

in which:
- a=1 or 2, b=0, 1 or 2 and a+b=1, 2 or 3;
- the symbols W, which may be identical or different, represent a linear or branched $C_2$-$C_6$ alkenyl group,
- and the symbols Z, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals, (ii) and optionally at least one siloxyl unit having the following formula:

$$Z^1_a SiO_{\frac{4-a}{2}} \quad (A.2)$$

in which:
- a=0, 1, 2 or 3,
- the symbols $Z^1$, which may be identical or different, represent a monovalent hydrocarbon-based group containing from 1 to 30 carbon atoms, preferably chosen from the group formed by alkyl groups containing from 1 to 8 carbon atoms inclusive and aryl groups containing between 6 and 12 carbon atoms, and even more preferentially chosen from the group formed by methyl, ethyl, propyl, 3,3,3-trifluoropropyl, xylyl, tolyl and phenyl radicals.

Advantageously, Z and $Z^1$ are chosen from the group formed by methyl and phenyl radicals, and W is chosen from the following list: vinyl, propenyl, 3-butenyl, 5-hexenyl, 9-decenyl, 10-undecenyl, 5,9-decadienyl and 6-11-dodecadienyl, and preferably, W is a vinyl.

In a preferred embodiment, in formula (A.1) a=1 and a+b=2 or 3 and in formula (A.2) a=2 or 3.

These organopolysiloxanes A may have a linear, branched or cyclic structure. Their degree of polymerization is preferably between 2 and 5,000.

When they are linear polymers, they are essentially formed from siloxyl units D chosen from the group formed by the siloxyl units $W_2SiO_{2/2}$, $WZSiO_{2/2}$ and $Z^1_2SiO_{2/2}$, and from siloxyl units M chosen from the group formed by the siloxyl units $W_3SiO_{1/2}$, $WZ_2SiO_{1/2}$, $W_2ZSiO_{1/2}$ and $Z^1_3SiO_{1/2}$. The symbols W, Z and $Z^1$ are as described above.

As examples of end units M, mention may be made of trimethylsiloxy, dimethylphenylsiloxy, dimethylvinylsiloxy or dimethylhexenylsiloxy groups.

As examples of units D, mention may be made of dimethylsiloxy, methylphenylsiloxy, methylvinylsiloxy, methylbutenylsiloxy, methylhexenylsiloxy, methyldecenylsiloxy or methyldecadienylsiloxy groups.

Said organopolysiloxanes A may be oils or gums with a dynamic viscosity from about 10 to 10,000,000 mPa·s at 25° C., generally from about 1,000 to 120,000 mPa·s at 25° C. When they are cyclic organopolysiloxanes, they are formed from siloxyl units D having the following formulae: $W_2SiO_{2/2}$, $Z_2SiO_{2/2}$ or $WZSiO_{2/2}$, which may be of the dialkylsiloxy, alkylarylsiloxy, alkylvinylsiloxy or alkylsiloxyl type. Examples of such siloxyl units have already been mentioned above. Said cyclic organopolysiloxanes A have a viscosity from about 10 to 5,000 mPa·s at 25° C.

Preferably, the organopolysiloxane compound A has a mass content of Si-vinyl units of between 0.001 and 30%, preferably between 0.01 and 10%.

Organohydrogenpolysiloxane B

According to a preferred embodiment, the organohydrogenopolysiloxane compound B is an organopolysiloxane containing at least two hydrogen atoms per molecule, bonded to an identical or different silicon atom, and preferably containing at least three hydrogen atoms per molecule directly bonded to an identical or different silicon atom.

Advantageously, the organohydrogenopolysiloxane compound B is an organopolysiloxane comprising:

(i) at least two siloxyl units and preferably at least three siloxyl units having the following formula:

$$H_d Z^3_e SiO_{\frac{4-(d+e)}{2}} \quad (B.1)$$

in which:
- d=1 or 2, e=0, 1 or 2 and d+e=1, 2 or 3,
- the symbols $Z^3$, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals, and (ii) optionally at least one siloxyl unit having the following formula:

$$Z^2_c SiO_{\frac{4-c}{2}} \quad (B.2)$$

in which:
- c=0, 1, 2 or 3,
- the symbols $Z^2$, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals.

The organohydrogenopolysiloxane compound B may be formed solely from siloxyl units of formula (B.1) or may also comprise units of formula (B.2). It may have a linear, branched or cyclic structure. The degree of polymerization is preferably greater than or equal to 2. More generally, it is less than 5,000.

Examples of siloxyl units of formula (B.1) are especially the following units: $H(CH_3)_2SiO_{1/2}$, $H(CH_3)SiO_{2/2}$ and $H(C_6H_5)SiO_{2/2}$.

When they are linear polymers, they are essentially formed from:
- siloxyl units D chosen from the units having the following formulae $Z^2_2SiO_{2/2}$ or $Z^3HSiO_{2/2}$, and siloxyl units M chosen from the units having the following formulae $Z^2{}_3SiO_{2/2}$ or $Z^3{}_2HSiO_{1/2}$,
the symbols $Z^2$ and $Z^3$ are as described above.

These linear organopolysiloxanes may be oils with a dynamic viscosity from about 1 to 100,000 mPa·s at 25° C., generally from about 10 to 5,000 mPa·s at 25° C., or gums with a dynamic viscosity of about 1,000,000 mPa·s or more at 25° C.

When they are cyclic organopolysiloxanes, they are formed from siloxyl units D having the following formulae $Z^2{}_2SiO_{2/2}$ and $Z^3HSiO_{2/2}$, which may be of the dialkylsiloxy or alkylarylsiloxy type or units $Z^3HSiO_{2/2}$ solely, the symbols $Z^2$ and $Z^3$ are as described above. They have a viscosity from about 1 to 5,000 mPa·s.

Examples of linear organohydrogenopolysiloxane compounds B are: dimethylpolysiloxanes bearing hydrogenodimethylsilyl end groups, dimethyl, hydrogenomethylpolysiloxanes bearing trimethylsilyl end groups, dimethyl, hydrogenomethylpolysiloxanes bearing hydrogenodimethylsilyl end groups, hydrogenomethylpolysiloxanes bearing trimethylsilyl end groups, and cyclic hydrogenomethylpolysiloxanes.

The oligomers and polymers corresponding to the general formula (B.3) are especially preferred as organohydrogenopolysiloxane compound B:

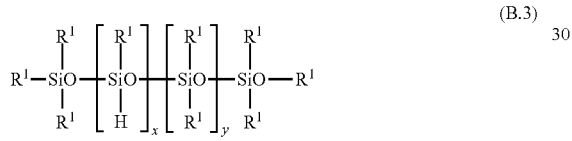

(B.3)

in which:
x and y are an integer ranging between 0 and 200,
the symbols $R^1$, which may be identical or different, represent, independently of each other:
  a linear or branched alkyl radical containing 1 to 8 carbon atoms, optionally substituted with at least one halogen, preferably fluorine, the alkyl radicals preferably being methyl, ethyl, propyl, octyl and 3,3,3-trifluoropropyl,
  a cycloalkyl radical containing between 5 and 8 cyclic carbon atoms,
  an aryl radical containing between 6 and 12 carbon atoms, or
  an aralkyl radical bearing an alkyl part containing between 5 and 14 carbon atoms and an aryl part containing between 6 and 12 carbon atoms.

The following compounds are particularly suitable for the invention as organohydrogenopolysiloxane compound B:

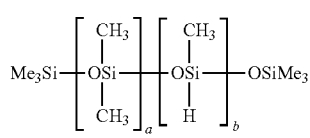

S1

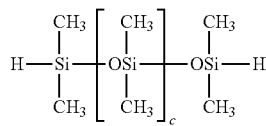

S2

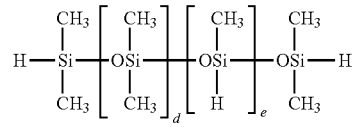

S3 with a, b, c, d and e defined below:
in the polymer of formula S1:
  $0 \leq a \leq 150$, preferably $0 \leq a \leq 100$, and more particularly $0 \leq a \leq 20$, and
  $1 \leq b \leq 90$, preferably $10 \leq b \leq 80$ and more particularly $30 \leq b \leq 70$,
in the polymer of formula S2: $0 \leq c \leq 100$, preferably $0 \leq c \leq 15$
in the polymer of formula S3: $5 \leq d \leq 200$, preferably $20 \leq d \leq 100$, and $2 \leq e \leq 90$, preferably $10 \leq e \leq 70$.

In particular, an organohydrogenopolysiloxane compound B that is suitable for use in the invention is the compound of formula S1, in which a=0.

Preferably, the organohydrogenopolysiloxane compound B has a mass content of SiH units of between 0.2 and 91%, preferably between 0.2 and 50%.

In an embodiment, the organohydrogenopolysiloxane compound B is a branched polymer. Said branched organohydrogenopolysiloxane compound B comprises
  a) at least two different siloxyl units selected from siloxyl unit M of formula $R_3SiO_{1/2}$, siloxyl unit D of formula $R_2SiO_{2/2}$, siloxyl unit T of formula $RSiO_{3/2}$ and siloxyl unit Q of formula $SiO_{4/2}$, in which R denotes monovalent hydrocarbon group with 1 to 20 carbon atoms or an hydrogen atom, and
  b) provided that at least one of these siloxyl units is siloxyl unit T or Q and at least one of siloxyl units M, D or T contains a Si—H group.

Thus, according to one preferable embodiment, the branched organohydrogenopolysiloxane compound B can be selected from the following groups:
organopolysiloxane resin of formula M'Q, which is essentially formed from:
  (a) monovalent siloxyl unit M' of formula $R_2HSiO_{1/2}$; and
  (b) tetravalent siloxyl unit Q of formula $SiO_{4/2}$; and
organopolysiloxane resin of formula MD'Q, which is basically consisted of the following units:
  (a) divalent siloxyl unit D' of formula $R_2HSiO_{2/2}$;
  (b) monovalent siloxyl unit M of formula $R_3SiO_{1/2}$; and
  (c) tetravalent siloxyl unit Q of formula $SiO_{4/2}$;
wherein R represents monovalent hydrocarbyl having 1 to 20 carbon atoms, preferably represents monovalent aliphatic or aromatic hydrocarbyl having 1 to 12, more preferably 1 to 8 carbon atoms.

As a further embodiment, a mixture of at least a linear organohydrogenopolysiloxane compound B and at least a branched organohydrogenopolysiloxane compound B can be used. In this case, the linear and branched organohydrogenopolysiloxane compound B can be mixed in any proportion in a wide range, and the mixing proportion may be adjusted depending on the desired product properties such as hardness and the ratio of Si—H to alkenyl group.

In the context of the invention, the proportions of the organopolysiloxane A and of the organohydrogenopolysiloxane B are such that the mole ratio of the hydrogen atoms bonded to silicon (Si—H) in the organohydrogenopolysiloxane B to the alkenyl radicals bonded to silicon (Si—CH=CH$_2$) in the organopolysiloxane A is between 0.2 and 20, preferably between 0.5 and 15, more preferentially between 0.5 and 10 and even more preferentially between 0.5 and 5.

Catalyst C

Catalyst C consisting of at least one metal, or compound, from the platinum group are well known. The metals of the platinum group are those known under the name platinoids, this term combining, besides platinum, ruthenium, rhodium, palladium, osmium and iridium.

Platinum and rhodium compounds are preferably used. Complexes of platinum and of an organic product described in patents U.S. Pat. Nos. 3,159,601, 3,159,602, 3,220,972 and European patents EP A 0 057 459, EP A 0 188 978 and EP A 0 190 530, and complexes of platinum and of vinyl-organosiloxanes described in patents U.S. Pat. Nos. 3,419,593, 3,715,334, 3,377,432 and 3,814,730 may be used in particular. Specific examples are: platinum metal powder, chloroplatinic acid, a complex of chloroplatinic acid with β-diketone, a complex a chloroplatinic acid with olefin, a complex of a chloroplatinic acid with 1,3-divinyltetramethyldisiloxane, a complex of silicone resin powder that contains aforementioned catalysts, a rhodium compound, such as those expressed by formulae: $RhCl(Ph_3P)_3$, $RhCl_3[S(C_4H_9)_2]_3$, etc.; tetrakis(triphenyl)palladium, a mixture of palladium black and triphenylphosphine, etc.

The platinum catalyst ought preferably to be used in a catalytically sufficient amount, to allow sufficiently rapid crosslinking at room temperature. Typically, 1 to 200 ppm by weight of the catalyst are used, based in the amount of Pt metal, relative to the total silicone composition preferably 1 to 100 ppm by weight, more preferably 1 to 50 ppm by weight.

Filler D

To allow a sufficiently high mechanical strength the addition-crosslinking silicone compositions can comprise filler, such as for example silica fine particles, as reinforcing fillers D. Precipitated and fumed silicas and mixtures thereof can be used. The specific surface area of these actively reinforcing fillers ought to be at least 50 $m^2/g$ and preferably in the range from 100 to 400 $m^2/g$ as determined by the BET method. Actively reinforcing fillers of this kind are very well-known materials within the field of the silicone rubbers. The stated silica fillers may have hydrophilic character or may have been hydrophobized by known processes.

In a preferred embodiment, the silica reinforcing filler is fumed silica with a specific surface area of at least 50 $m^2/g$ and preferably in the range from 100 to 400 $m^2/g$ as determined by the BET method. Fumed silica may be used as is, in an untreated form, but is preferably subjected to hydrophobic surface treatment. In those cases, where a fumed silica that has undergone hydrophobic surface treatment is used, either a fumed silica that has been subjected to preliminary hydrophobic surface treatment may be used, or a surface treatment agent may be added during mixing of the fumed silica with the organopolysiloxane A, so that the fumed silica is treated in-situ.

The surface treatment agent may be selected from any of the conventionally used agents, such as alkylalkoxysilanes, alkylchlorosilanes, alkylsilazanes, silane coupling agents, titanate-based treatment agents, and fatty acid esters, and may use either a single treatment agent, or a combination of two or more treatment agents, which may be used either simultaneously or at different timings.

The amount of the silica reinforcing filler D in the addition-crosslinking silicone compositions is in the range from 5% to 40% by weight, preferably 10% to 35% by weight of the total composition. If this blend quantity is less than 5% by weight, then adequate elastomer strength may not be obtainable, whereas if the blend quantity exceeds 40% by weight, the actual blending process may become difficult.

The silicone compositions according to the invention may also comprise other fillers like a standard semi-reinforcing or packing filler, hydroxyl functional silicone resins, pigments, or adhesion promoters.

Non siliceous minerals that may be included as semi-reinforcing or packing mineral fillers can be chosen from the group constituted of: carbon black, titanium dioxide, aluminium oxide, hydrated alumina, calcium carbonate, ground quartz, diatomaceous earth, zinc oxide, mica, talc, iron oxide, barium sulfate and slaked lime.

Silicone resin denotes an organopolysiloxane comprising at least one T and/or one Q siloxy unit with Q: $SiO_{2/2}$ and T: $R1SiO_{3/2}$. The hydroxyl functional silicone resin are well known and can be chosen from MQ(OH), MDT(OH), or DT(OH) resins with M: $R1R2R3SiO_{1/2}$, D:$R1R2SiO_{2/2}$, Q(OH): $(OH)SiO_{3/2}$, and T(OH): $(OH)R1SiO_{2/2}$, the R1, R2 and R3 groups being chosen independently of one another from:

linear or branched alkyl groups having from 1 to 8 carbon atoms inclusive, optionally substituted by one or more halogen atoms; and aryl or alkylaryl groups containing from 6 to 14 carbon atoms inclusive.

Preferably, the hydroxyl functional silicone resin is a MQ(OH) resin.

The crosslinkable silicone composition X can advantageously comprise a thixotropic agent.

Thixotropic Agent E

The composition X can also comprise a thixotropic agent E, which is a rheological agent which serves to adjust the shear-thinning and thixotropic characteristics.

In an embodiment, the thixotropic agent E contains polar groups. Preferably constituent the thixotropic agent E can be selected from the group consisting of: an organic or organosilicon compound having at least one epoxy group, an organic or organopolysiloxane compound having at least one (poly)ether group, an organic compound having at least (poly)ester group, an organopolysiloxane having at least one aryl group and any combination thereof.

According to an embodiment, the thixotropic agent E is an organopolysiloxane-polyoxyalkylene copolymer E', also known as polydiorganosiloxane-polyether copolymers or polyalkylene oxide modified polyorganosiloxanes, are organopolysiloxanes containing siloxyl units which carry alkylene oxide chain sequences. Preferably, organopolysiloxane-polyoxyalkylene copolymer E' are organopolysiloxanes containing siloxyl units which carry ethylene oxide chain sequences and/or propylene oxide chain sequences.

In a preferred embodiment the organopolysiloxane-polyoxyalkylene copolymer E' is an organopolysiloxane containing siloxyl comprising units of the formula (E-1):

$$[R^1_a Z_b SiO_{(4-a-b)/2}]_n \qquad (E-1)$$

in which each $R^1$ is independently selected from hydrocarbon-based group containing from 1 to 30 carbon atoms, preferably chosen from the group formed by alkyl groups containing from 1 to 8 carbon atoms, alkenyl groups containing from 2 to 6 carbon atoms and aryl groups containing between 6 and 12 carbon atoms;

each Z is a group —$R^2$—$(OC_pH_{2p})_q(OCH(CH_3)$—$CH_2)_s$—$OR^3$, where n is an integer greater than 2;

a and b are independently 0, 1, 2 or 3 and a+b=0, 1, 2 or 3, $R^2$ is a divalent hydrocarbon group having from 2 to 20 carbon atoms or a direct bond;

$R^3$ is an hydrogen atom or a group as defined for $R^1$;

p and r are independently an integer from 1 to 6;

q and s are independently 0 or an integer such that 1<q+s<400;

and wherein each molecule of the organopolysiloxane-polyoxyalkylene copolymer E' contains at least one group Z.

In a preferred embodiment, in the formula (E-1) above:

n is an integer greater than 2;

a and b are independently 0, 1, 2 or 3 and a+b=0, 1, 2 or 3, $R^1$ is an alkyl group containing from 1 to 8 carbon atoms inclusive, and most preferably $R^1$ is a methyl group, $R^2$ is a divalent hydrocarbon group having from 2 to 6 carbon atoms or a direct bond;

p=2 and r=3, q is comprised between 1 and 40, most preferably between 5 and 30, s is comprised between 1 and 40, most preferably between 5 and 30, and $R^3$ is an hydrogen atom or an alkyl group containing from 1 to 8 carbon atoms inclusive, and most preferably $R^3$ is an hydrogen atom.

In a most preferred embodiment, the organopolysiloxane-polyoxyalkylene copolymer E' is an organopolysiloxane containing a total number of siloxyl units (E-1) comprised 1 and 200, preferably between 50 and 150 and a total number of Z groups comprised between 2 and 25, preferably between 3 and 15.

An example of organopolysiloxane-polyoxyalkylene copolymer E' that can be used in the method of the invention corresponds to the formula (E-2)

$$R^a{}_3SiO[R^a{}_2SiO]_t[R^aSi(R^b-(OCH_2CH_2)_x(OCH(CH_3)CH_2)_y-OH)O]_rSiR^a{}_3 \quad (E-2)$$

where each $R^a$ is independently selected from alkyl groups containing from 1 to 8 carbon atoms and preferably $R^a$ is a methyl group, each $R^b$ is a divalent hydrocarbon group having from 2 to 6 carbon atoms or a direct bond, and preferably $R^b$ is a propyl group, x and y are independently integers comprised from 1 to 40, preferably from 5 and 30, and most preferably from 10 to 30, t is comprised from 1 to 200, preferably from 25 to 150, and r is comprised from 2 to 25, preferably from 3 to 15.

Advantageously, in an embodiment the organopolysiloxane-polyoxyalkylene copolymer E' is:

$Me_3SiO[Me_2SiO]_{75}[MeSi((CH_2)_3-(OCH_2CH_2)_{22}(OCH_-(CH_3)CH_2)_{22}-OH)O]_7SiMe_3$.

In another embodiment, the organopolysiloxane-polyoxyalkylene copolymer E' is a branched organopolysiloxane-polyoxyalkylene copolymer comprising at least one T and/or one Q siloxy unit with Q corresponding to the siloxy unit $SiO_{2/2}$ and T corresponding to the siloxy unit $R'SiO_{3/2}$ where $R^1$ is independently selected from hydrocarbon-based group containing from 1 to 30 carbon atoms, preferably chosen from the group formed by alkyl groups containing from 1 to 8 carbon atoms, alkenyl groups containing from 2 to 6 carbon atoms and aryl groups containing between 6 and 12 carbon atoms In another embodiment, the organopolysiloxane-polyoxyalkylene copolymer E' can further comprise other functional groups chosen from the group consisting of: alkenyl groups having from 2 to 6 carbon atoms, hydroxide, hydrogen, (meth)acrylate groups, amino groups and hydrolysable groups as alkoxy, enoxy, acetoxy or oxime groups.

Methods of preparing polydiorganosiloxane-polyoxyalkylene copolymers are well known in the art. For example, a polydiorganosiloxane-polyoxyalkylene copolymer can be prepared using a hydrosilylation reaction by reacting, for example, a polydiorganosiloxane containing silicon-bonded hydrogen atoms with a polyoxyalkylene containing groups having aliphatic unsaturation in the presence of a platinum group catalyst.

In one embodiment, the amount of the thixotropic agent E in the addition-crosslinking silicone compositions is at least 0.3% weight, preferably at least 0.4% weight, most preferably in the range from 0.6% to 4% weight, and even most preferably from 0.6% to 3% weight with respect to the total weight of the silicone composition.

In another embodiment, the amount of the thixiotropic agent E in the addition-crosslinking silicone compositions is at least 0.2% weight, preferably at least 0.25% weight, most preferably in the range from 0.25% to 3% weight, and even most preferably from 0.25% to 2% weight with respect to the total weight of the silicone composition Crosslinking Inhibitor F Crosslinking inhibitors are commonly used in addition crosslinking silicone compositions to slow the curing of the composition at ambient temperature. The crosslinking inhibitor F may be chosen from the following compounds:

acetylenic alcohols.

organopolysiloxanes substituted with at least one alkenyl that may optionally be in cyclic form, tetramethylvinyltetrasiloxane being particularly preferred, pyridine, organic phosphines and phosphites, unsaturated amides, and alkyl and allyl maleates.

These acetylenic alcohols (Cf. FR-B-1 528 464 and FR-A-2 372 874), which are among the preferred hydrosilylation-reaction thermal blockers, have the formula:

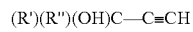
(R')(R")(OH)C—C≡CH in which:

R is a linear or branched alkyl radical, or a phenyl radical; and

R" is H or a linear or branched alkyl radical, or a phenyl radical; the radicals R' and R" and the carbon atom a to the triple bond possibly forming a ring.

The total number of carbon atoms contained in R' and R" being at least 5 and preferably from 9 to 20. For the said acetylenic alcohols, examples that may be mentioned include:

1-ethynyl-1-cyclohexanol;

3-methyl-1-dodecyn-3-ol;

3,7,11-trimethyl-1-dodecyn-3-ol;

1,1-diphenyl-2-propyn-1-ol;

3-ethyl-6-ethyl-1-nonyn-3-ol;

2-methyl-3-butyn-2-ol;

3-methyl-1-pentadecyn-3-ol; and diallyl maleate or diallyl maleate derivatives.

In a preferred embodiment, the crosslinking inhibitor is 1-ethynyl-1-cyclohexanol To obtain a longer working time or "pot life", the quantity of the inhibitor is adjusted to reach the desired "pot life". The concentration of the catalyst inhibitor in the present silicone composition is sufficient to slow curing of the composition at ambient temperature. This concentration will vary widely depending on the particular inhibitor used, the nature and concentration of the hydrosilylation catalyst, and the nature of the organohydrogenpolysiloxane. Inhibitor concentrations as low as one mole of inhibitor per mole of platinum group metal will in some instances yield a satisfactory storage stability and cure rate. In other instances, inhibitor concentrations of up to 500 or more moles of inhibitor per mole of platinum group metal may be required. The optimum concentration for an inhibitor in a given silicone composition can be readily determined by routine experimentation.

Advantageously, the amount of the crosslinking inhibitor F in the addition-crosslinking silicone compositions is in the range from 0.01% to 0.2% weight, preferably from 0.03% to 0.15% weight with respect to the total weight of the silicone composition.

The use of the inhibitor is effective to avoid the premature curing of the silicone composition on the tip of the nozzle and subsequent disfiguration of the printed layer.

In a preferred embodiment, the crosslinkable silicone composition X of the invention comprise, per 100% weight of the silicone composition:
from 45 to 80% weight of at least one organopolysiloxane compound A,
from 0.1 to 10% weight of at least one organohydrogenopolysiloxane compound B,
from 5 to 40% weight of at least one reinforcing silica filler D,
optionally from 0.3 to 4% weight of at least one thixotropic agent E,
from 0.001 to 0.01% weight of platinum and
from 0.01 to 0.2% weight of at least one crosslinking inhibitor F.

Multi-Part Composition

The crosslinkable silicone composition X can be a one-part composition comprising components A to E in a single part or, alternatively, a multi-part composition comprising these components in two or more parts, provided components B, and C are not present in the same part. For example, a multi-part composition can comprise a first part containing a portion of component A and all of component C, and a second part containing the remaining portion of component A and all of component B. In certain embodiments, component A is in a first part, component B is in a second part separate from the first part, and component C is in the first part, in the second part, and/or in a third part separate from the first and second parts. Components D, E and F may be present in a respective part (or parts) along with at least one of components B, or C, and/or can be in a separate part (or parts).

The one-part composition is typically prepared by combining the principal components and any optional ingredients in the stated proportions at ambient temperature. Although the order of addition of the various components is not critical if the composition is to be used immediately, the hydrosilylation catalyst is typically added last at a temperature below about 30° C. to prevent premature curing of the composition.

Also, the multi-part composition can be prepared by combining the components in each part. Combining can be accomplished by any of the techniques understood in the art such as, blending or stirring, either in a batch or continuous process in a particular device. The particular device is determined by the viscosity of the components and the viscosity of the final composition.

In certain embodiments, when the crosslinkable silicone compositions X are multipart silicone compositions, the separate parts of the multi-part crosslinkable silicone composition may be mixed in a dispense printing nozzle, e.g. a dual dispense printing nozzle, prior to and/or during printing. Alternatively, the separate parts may be combined immediately prior to printing.

In another embodiment, the crosslinkable silicone composition X precursor of the silicone elastomer article is a silicone composition crosslinkable through polycondensation reaction which are well known by the skilled person. In this embodiment, the composition X comprises:
at least one organopolysiloxane G comprising at least two groups chosen in the group consisting of OH groups and hydrolysable groups,
a polycondensation catalyst,
optionally at least one crosslinking agent H and
optionally a filler D as disclosed before.

Organopolysiloxane G

Preferably, the organopolysiloxane G comprises at least two groups chosen in the group consisting of: hydroxy, alcoxy, alcoxy-alkylene-oxy, amino, amido, acylamino, aminoxy, iminoxy, cetiminoxy, acyloxy and enoxy groups.

Advantageously, polyorganosiloxane G comprises:
(i) at least two siloxyl units of formula (V):

$$R^1_g Y_h SiO_{(4-(g+h))/2} \quad (V)$$

in which:
R', identical or different, represent monovalents hydrocarbon radicals comprising from 1 to 30 carbon atoms;
Y, identical or different, represent each an hydrolysable and condensable group or a hydroxy group, and are preferably chosen in the group consisting of hydroxy, alkoxy, alcoxy-alkylene-oxy, amino, amido, acylamino, aminoxy, iminoxy, cetiminoxy, acyloxy, iminoxy, cetiminoxy and enoxy group,
g is 0, 1 or 2, h is 1, 2 or 3, the sum g+h is 1, 2 or 3, and
(ii) optionally one or more siloxyl unit(s) of formula (VI)

$$: R^2_i SiO_{\frac{4-i}{2}} \quad (VI)$$

in which
$R^2$, identical or different, represent monovalents hydrocarbon radicals comprising from 1 to 30 carbon atoms optionally substituted by one or more halogen atoms or by amino, ether, ester, epoxy, mercapto or cyano groups, and i is 0, 1, 2 or 3.

As example of hydrolysable and condensable group Y of alkoxy type it is possible to cite groups having from 1 to 8 carbon atoms such as methoxy, ethoxy, n-propoxy, isopropoxy, n-butoxy, iso-butoxy, sec-butoxy, tert-butoxy, 2-methoxyethoxy, hexyloxy or octyloxy.

As example of hydrolysable and condensable group Y of alcoxy-alkylene-oxy type, it is possible to cite methoxy-ethylene-oxy.

As example of hydrolysable and condensable group Y of amino type, it is possible to cite methylamino, dimethylamino, ethylamino, diethylamino, n-butylamino, sec-butylamino or cyclohexylamino.

As example of hydrolysable and condensable group Y of amido type, it is possible to cite N-methyl-cetamido.

As example of hydrolysable and condensable group Y of acylamino type, it is possible to cite benzoyl-amino.

As example of hydrolysable and condensable group Y of aminoxy type, it is possible to cite dimethylaminoxy, diethylaminoxy, dioctylaminoxy ou diphenylaminoxy.

As example of hydrolysable and condensable group Y of iminoxy and in particulier cétiminoxy type, it is possible to cite groups derived from the following oximes: acetophénone-oxime, acetone-oxime, benzophenone-oxime, methyl-ethyl-cetoxime, di-isopropylcetoxime ou methyl-isobutyl-cetoxime.

As example of hydrolysable and condensable group Y of acyloxy type, it is possible to cite acetoxy.

As example of hydrolysable and condensable group Y of enoxy type, it is possible to cite 2-propenoxy.

The viscosity of the organopolysiloxane G is generally comprised between 50 mPa·s and 1,000,000 mPa·s at 25° C.

Preferably G is of formula (VII):

$$Y_j R^3_{3-j} Si-O-(SiR^3_2-O)_p-SiR^3_{3-j} Y_j \qquad (VII)$$

in which:
Y, identical or different, represent each an hydrolysable and condensable group or a hydroxy group, and preferably are chosen in the group consisting of hydroxy, alkoxy, alkoxy-alkylene-oxy, amino, amido, acylamino, aminoxy, iminoxy, cetiminoxy, acyloxy and enoxy, $R^3$, identical or different, represent monovalent hydrocarbon radical comprising from 1 to 30 carbon atoms and optionally substituted by one or more halogen atoms or amino, ether, ester, epoxy, mercapto or cyano groups, j is 1, 2 or 3, preferably is 2 or 3, and when Y is a hydroxyl group then j=1, p is an integer equal or greater than 1, preferably p is an integer comprised between 1 and 2000.

In formula (V), (VI) and (VII), $R^1$, $R^2$ and $R^3$ are preferably:
alkyl radicals comprising from 1 to 20 carbon atoms, optionally substituted by one or more aryl or cycloalkyl groups, by one or more halogen atoms or by amino, ether, ester, epoxy, mercapto, cyano or (poly)glycol groups. For exemple methyl, ethyl, propyl, isopropyl, butyl, pentyl, hexyl, ethyl-2 hexyle, octyle, decyl, trifluoro-3,3,3 propyl, trifluoro-4,4,4 butyl, pentafluoro-4,4,4,3,3 butyl;
cycloalkyl and halogenocycloalkyl groups comprising from 5 to 13 carbon atoms such as cyclopentyl, cyclohexyl, methylcyclohexyl, propylcyclohexyl, difluoro-2,3 cyclobutyl, difluoro-3,4 methyl-5 cycloheptyl;
aryl and halogenoaryl mononuclear comprising from 6 to 13 carbon atoms such as: phenyle, tolyle, xylyle, chlorophenyle, dichlorophenyle, trichlorophenyle; or
alcenyl radicals comprising from 2 to 8 carbon atoms such as: vinyl, allyl and butene-2 yl.

In the particular embodiment when G is of formula (VII) with Y of hydroxyl type, thus d is preferably 1. In this case, it is preferably to use poly(dimethylsiloxane) having terminal silanols groups (also called «alpha-omega»position).

Organopolysiloxane G can also be chosen in the group consisting of organopolysiloxane resins carrying at least one hydroxy or alkoxy group, groups which are either condensable or hydrolysable, which comprise at least two different siloxyl units chosen among groups of formula M, D, T and Q with:
M=$(R^0)_3 SiO_{1/2}$,
D=$(R^0)_2 SiO_{2/2}$,
T=$R^0 SiO_{3/2}$, and
Q=$SiO_{4/2}$;
formula in which $R^0$ represents a monovalent hydrocarbon group comprising from 1 to 40 carbon atoms, and preferably from 1 to 20 carbon atoms, or a group —OR''' with R'''=H or an alkyl radical comprising from 1 to 40 carbon atoms, and preferably from 1 to 20 carbon atoms; with the condition that the resins comprise at least one motif T or Q unit.

Said resin has preferably a weight content of hydroxy or alcoxy substituents comprised between 0.1 and 10% by weight with respect to the weight of the resin, and preferably a weight content of hydroxy or alcoxy substituents comprised between 0.2 and 5% by weight with respect to the weight of the resin.

The organopolysiloxane resins have generally about 0.001 to 1.5 OH groups and/or alkoxyl per silicium atom. These organopolysiloxane resins are generally prepared by co-hydrolysis and co-condensation of chlorosilanes such as the ones of formula $(R^{19})_3 SiCl$, $(R^{19})_2 Si(Cl)_2$, $R^{19} Si(Cl)_3$ or $Si(Cl)_4$, radicals $R^{19}$ are identical or different and are in the group consisting of linear or branched alkyl in $C_1$ to $C_6$, phenyl and trifluoro-3,3,3 propyl.

For example $R^{19}$ is methyl, ethyl, isopropyle, tertiobutyl and n-hexyl.

Examples of resins are silicic resins of $T^{(OH)}$, $DT^{(OH)}$, $DQ^{(OH)}$, $DT^{(OH)}$, $MQ^{(OH)}$, $MDT^{(OH)}$, $MDQ^{(OH)}$ type or a mixture.

Crosslinking Agent H

In this second embodiment, the silicone composition crosslinkable through polycondensation reaction can further comprise such crosslinking agent H. It is preferably an organosilicium compound carrying per molecule more than 2 hydrolysable and condensable groups linked to the silicium atoms. Such agents are well known from the skilled person and are commercially available.

The crosslinking agent H is preferably a silicium compound whose each molecule comprises at least 3 hydrolysable and condensable Y groups, said agent H having formula (VIII):

$$R^4_{(4-k)} SiY_k \qquad (VIII)$$

in which:
$R^4$ radicals, identical or different, represent monovalent hydrocarbon radicals in $C_1$ to $C_{30}$, Y, identical or different, are chosen in the group consisting of alkoxy, alkoxy-alkylene-oxy, amino, amido, acylamino, aminoxy, iminoxy, cetiminoxy, acyloxy or enoxy groups, and preferably Y is an alcoxy, acyloxy, enoxy, cetiminoxy or oxime group, k=2, 3 or 4, preferably k=3 or 4.

Examples of Y groups are the same as the ones cited for G above when Y is an hydrolysable and condensable group. Other examples of crosslinking agent H, are alkoxysilanes and partial hydrolysis products of silane of formula (IX):

$$R^5_1 Si(OR^6)_{(4-1)} \qquad (IX)$$

in which:
$R^6$, identical or different, represent alkyl radical comprising from 1 to 8 carbon atoms such as methyl, ethyl, propyl, butyl, pentyl, ethyl-2 hexyl, octyl and decyl, oxyalkylenes groups in $C_3$-$C_6$, $R^5$, identical or different, represent a saturated or unsaturated, linear or branched aliphatic hydrocarbon group, carbocycle group, saturated or unsaturated and/or aromatic, monocycle or polycycle, and 1 is 0, 1 or 2.

Among crosslinking agent H, alcoxysilanes, cetiminoxysilanes, alkyl silicates and alkyl polysilicates, in which the organic radicals are alkyl radical shaving from 1 to 4 carbon atoms are preferred.

Preferably, the following crosslinking agent H, are used alone or in mixture:

ethyl polysilicate and n-propyl polysilicate;

alkoxysilanes such as dialkoxysilanes, for example dialkyldialkoxysilanes, trialkoxysilanes, for example alkyltrialkoxysilanes, and tetraalkoxysilanes, preferably propyltrimethoxysilane, methyltrimethoxysilane, methyltriethoxysilane, ethyltrimethoxysilane, ethyltriethoxysilane, isobutyltrimethoxysilane, isobutyltriethoxysilane, propyltriethoxysilane, tetramethoxysilane, tetraethoxysilane, tetrapropoxysilane, tetrabutoxysilane, 1,2 bis(trimethoxysilyl)ethane, 1,2-bis(triethoxysilyl)ethane, tetra-isopropoxysilane, phenyltriethoxysilane, phenyltrimethoxysilane, vinyltriethoxysilane, vinyltrimethoxysilane and those of following formula: $CH_2=CHSi(OCH_2CH_2OCH_3)_3$, $[CH_3][OCH(CH_3)CH_2OCH_3]Si[OCH_3]_2$, $Si(OC_2H_4OCH_3)_4$ et $CH_3Si(OC_2H_4OCH_3)_3$, acyloxysilanes such as the following acetoxysilanes: tetraacetoxysilane, methyl-triacetoxysilane, ethyltriacetoxysilane, vinyltriacetoxysilane, propyltriacétoxysilane butyltriacetoxysilane, phenyltriacetoxysilane, octyltriacetoxysilane, dimethyldiacetoxysilane, phenylmethyldiacetoxysilane, vinylmethyldiacetoxysilane, diphenyldiacetoxysilane and tetraacetoxysilane, silanes comprising alkoxy and acetoxy groups such as: methyl-diacetoxymethoxysilane, methylacetoxydimethoxysilane, vinyldiacetoxy-methoxysilane, vinylacetoxydimethoxysilane, methyldiacetoxyethoxysilane and methylacetoxydiethoxysilane, methyltris(methylethyl-cetoximo)silane, 3-cyanopropyltrimethoxysilane, 3-cyanopropyl-triethoxysilane, 3-(glycidyloxy)propyltriethoxysilane, vinyl-tris(methylethylcetoximo)silane, tetra-kis(methylethylcetoximo)silane.

Generally from 0.1 to 60 parts by weight of crosslinking agent H are used for 100 parts by weight of polyorganosiloxane G. Preferably, 0.5 to 15 parts by weight of crosslinking agent H are used for 100 parts by weight of polyorganosiloxane G.

Polycondensation Catalyst

The polycondensation catalyst can be a tin, zinc, iron, zirconium, bismuth or titanium derivative or an organic compounds as amine or guanidines as disclosed for example in EP2268743 and EP2222688. Use may be made, as tin-derived condensation catalyst, of tin monocarboxylates and dicarboxylates, such as tin 2-ethylhexanoate, dibutyltin dilaurate or dibutyltin diacetate (see the work by Noll, "Chemistry and Technology of Silicone", page 337, Academic Press, 1968, 2nd edition, or the patents EP 147 323 or EP 235 049). Other possible metal derivatives include chelates, for example dibutyltin acetoacetonate, sulfonates, alcoholates, etc.

Other Additives

The crosslinkable silicone composition X precursor of the silicone elastomer article, crosslinkable either by polycondensation or by polyaddition, can further comprise functional additives usual in silicone composition. The following functional families of additives can be cited:

adhesion promoter;

silicon resins;

thixotropic agents, color agent and additives for thermal resistance, oil resistance and fire resistance, for example metallic oxides.

Adhesion promoters are largely used in silicone composition. Advantageously, in the process according to the invention it is possible to use one or adhesion promoter chosen in the group consisting of:

alkoxylated organosilanes comprising, per molecule, at least one $C_2$-$C_6$ alkenyl group, organosilicate compounds comprising at least an epoxy radical chelates of metal M and/or metallic alkoxydes of formula:

$M(OJ)_n$, in which

M is chosen in the group consisting of: Ti, Zr, Ge, Li, Mn, Fe, Al and Mg or their mixtures, n=valence of M and J=linear or branched alkyl in $C_1$-$C_8$, Preferably M is chosen in the group consisting of: Ti, Zr, Ge, Li or Mn, and more preferably M is Titane. It is possible to associate for example an alkoxy radical of butoxy type.

Silicon resins are branched organopolysiloxanes well known and commercially available. They present, in their structure, at least two different units chosen among those of formula $R_3SiO_{1/2}$ (M unit), $R_2SiO_{2/2}$ (D unit), $RSiO_{3/2}$ (T unit) and $SiO_{4/2}$ (Q unit), at least one of these units being a T or Q unit.

Radical R are identical or different and chosen in the group consisting in alkyl linear or branched in C1-C6, hydroxyl, phenyl, trifluoro-3,3,3 propyl. Alkyl radicals are for example methyl, ethyl, isopropyl, tertiobutyl and n-hexyl.

As examples of branched oligomers or organopolysiloxanes polymers, there can be cited MQ resins, MDQ resins, TD resins and MDT resins, the hydroxyl functions can be carried by M, D and/or T units. As examples of resins that are particularly well suited, there can be cited hydroxylated MDQ resin having from 0.2 to 10% by weight of hydroxyl group.

The following examples are intended to illustrate and not to limit the invention.

EXAMPLES

Silicone compositions precursors of the silicone elastomer articles and support material compositions are prepared and printed using an extrusion 3D printer Delta Tower, according with disclosure.

Raw Materials

LSR Composition 1

A mixer is loaded with:
29 parts dimethylpolysiloxane oil blocked at both ends by $Me_2ViSiO_{1/2}$ units, having a viscosity of 60,000 mPa·s
29 parts of a dimethylpolysiloxane blocked at both ends by $Me_2ViSiO_{1/2}$ units, having a viscosity of 100,000 mPa·s
26 parts of silica fumed with a specific surface area measured by the BET method of 300 m²/g and 7 parts of hexamethyldisilazane.

The whole is heated at 70° C. under agitation for 1 hour and then devolatilised, cooled and stored as Base 1 of the composition 1

To 45 parts of this Base 1 is then added in a speed mixer:
Platinum metal which is introduced in the form of an organometallic complex at 10% by weight of Platinum metal, known as Karstedt's catalyst diluted in a vinyl oil.
3 parts: dimethylpolysiloxane oil having vinyl groups in the chain and at the chain ends and having a viscosity of 1,000 mPa·s
2 parts of a dimethylpolysiloxane oil having vinyl groups in the chain and at the chain ends and having a viscosity of 400 mPa·s The composition called LSR composition 1 part A is mixed during one minute at 1,000 rounds per minute in the speed mixer. The Pt content is 5 ppm To 45 parts of this Base 1 is then added in a speed mixer:
1.3 parts of an organohydrogenopolysiloxane M'Q resin comprising Si—H groups
0.5 parts of a linear organohydrogenopolysiloxane comprising Si—H groups in the chain and at chain ends and containing approximately 20% by weight of groups Si—H
1.5 parts of a dimethylpolysiloxane oil having vinyl groups in the chain and at the chain ends and having a viscosity of 400 mPa·s
1.6 parts: dimethylpolysiloxane oil having vinyl groups in the chain and at the chain ends and having a viscosity of 1000 mPa·s
0.08 parts of ethynyl-1-cyclohexanol-1 as crosslinking inhibitor.

The composition called LSR composition 1 part B is mixed during one minute at 1,000 rounds per/minute in the speed mixer.

RTV2 Composition 2 is prepared by mixing each component during one minute at 1,000 rounds per minute in the speed mixer.

|  | Part A | Part B |
|---|---|---|
| Dimethylpolysiloxane oil blocked at both ends by $Me_2ViSiO_{1/2}$ units, having a viscosity of 800 mPa.s | 52.8 | 50.5 |
| Fumed silica treated with hexamethyldisilazane | 27.2 | 26.57 |
| Dimethylpolysiloxane oil blocked at both ends by $Me_3SiO_{1/2}$ units, having a viscosity of 50 mPa.s | 20 | 11.7 |
| Linear organohydrogenopolysiloxane comprising Si—H groups in the chain and at chain ends and containing approximately 6% by weight of groups Si—H | — | 10.3 |
| Blue pigment base | — | 0.3 |
| Organometallic complex at 10% by weight of Platinum metal (Karstedt's catalyst) diluted in a vinyl oil | 0.025 | — |
| Ethynyl-1-cyclohexanol-1 as crosslinking inhibitor | — | 0.6 |

Example 1

Support Material Composition for 3D Printing

A support material composition comprising 6.2 wt. % of nanoclay in water is prepared as follows: 15 g of Laponite XLG are added by successive additions of amounts of 2 g to a plastic beaker comprising 225.43 g of demineralized water. The Laponite is mixed with a spatula between each addition in order to limit the formation of aggregates. After all the Laponite has been added, the resulting mixture is mixed 3 times using a speed mixer at room temperature, each cycle having the following parameters: 10 s at 500 r/min; 10 s at 1,000 r/min, 10 s at 1500 r/min; 10 s at 2,000 r/min; 10 s at 2,500 r/min and finally 12 seconds at 2,750 r/min.

The resulting transparent support material composition is then put in a cartridge and used for the 3D-printing.

Properties of the Support Material Compositions

Different support material compositions with different weights (percentages) of Laponite (2, 3, 4, 5, 6, 8, 10 and 12 wt. %) were prepared using the above mentioned method. The viscosities of the obtained compositions have been determined at different shear rates at 25° C., using a Haake MARS III rheometer (cone-plate of 2° and diameter of 20 mm at 25° C., GAP=100 μm). The results are presented in Table 1.

TABLE 1 viscosity (in Pa · s) of the different support material compositions in function of the shear rate applied

| Shear Rate ($s^{-1}$) | 2 wt. % | 3 wt. % | 4 wt. % | 5 wt. % | 6 wt. % | 8 wt. % | 10 wt. % | 12 wt. % |
|---|---|---|---|---|---|---|---|---|
| 0.01 $s^{-1}$ | 3.3 | 508 | 1214 | 3842 | 23274 | 68735 | 79646 | 135581 |
| 0.1 $s^{-1}$ | 2.6 | 96 | 235 | 629 | 2728 | 7066 | 9251 | 15353 |
| 1 $s^{-1}$ | 2.0 | 18 | 46 | 103 | 320 | 726 | 1074 | 1739 |
| 10 $s^{-1}$ | 1.4 | 3 | 9 | 17 | 37 | 75 | 125 | 197 |
| 20 $s^{-1}$ | 1.2 | 2 | 5 | 10 | 20 | 38 | 65 | 102 |

Starting from 3 wt. % of laponite in the composition, when no or low shear rate is applied, the compositions have a high viscosity (more than 500 Pa·s), the compositions are thus in a gel state. Furthermore, when a high shear rate is applied, the viscosities of the compositions are greatly lowered and drop below 500 Pa·s. The compositions are then in a liquid state and can therefore be used for the printing of the support.

The viscosities of the different support material compositions have also been measured at very low shear rate (0.05 and 0.01 $s^{-1}$) after having sheared the compositions for 90 s at 20 $s^{-1}$. The results are presented in table 2.

TABLE 2

Viscosities (in Pa · s) of the different support material compositions after having sheared the compositions for 90 s at 20 $s^{-1}$.

| Shear Rate ($s^{-1}$) | 2 wt % | 3 wt % | 4 wt % | 5 wt % | 6 wt % | 8 wt % | 10 wt % | 12 wt % |
|---|---|---|---|---|---|---|---|---|
| 0.05 $s^{-1}$ | 7 | 246 | 1117 | 1943 | 5202 | 14015 | 17686 | 29578 |
| 0.01 $s^{-1}$ | 7 | 246 | 1117 | 1943 | 23274 | 68735 | 79646 | 135581 |

These results show that the viscosities of the different support material compositions increase rapidly after stopping the shear stress. Starting from 3 wt. % of nanoclay, the support material compositions have properties suitable for the 3D printing of a silicone elastomer article.

3D-Printing

The 3D printing has been done using a Delta Tower 3D printer comprising a 1-component Viscotec dosage system for the support and a 2-component Viscotec dosage system equipped with a static mixer for the 2K silicone composition.

LSR Composition 1

The cartridge comprising the support material composition having 6.2 wt. % laponite is installed on the 1-component Viscotec dosage system with a static pressure of 1 bar and a nozzle of 500 μm.

Part A and part B of the LSR composition 1 are each put in a cartridge adapted to the 2-component Viscotec dosage system and put under 3 bars of pressure. The mixture of part A and part B of the LSR composition 1 in a 50/50 ratio is performed using a static mixer of 16 stages attached to a nozzle of 500 μm.

A supported hemisphere is then printed with a speed of 10 mm/s. The print heads successively printed each layer of support composition material and each layer of silicone composition.

The crosslinkable silicone composition precursor of the silicone elastomer article is crosslinked at 70° C. one hour and then 150° C. for 10 minutes in an oven. The support material did not adhere to the silicone elastomer article and was easily removed mechanically by brushing. The recovered nanoclay can be lyophilized and used again.

RTV2 Composition 2

An actuator was printed using parts A and B of the RTV2 Composition 2 and a support material composition having 10 wt. % laponite. The actuator has been printed using the protocol mentioned above for the LSR composition 1.

The support material was removed by immersion in water (10 parts of water for 1 part of support material composition).

The printed silicone actuator has the same mechanical properties as an injected silicone actuator. The printed silicone actuator has a shore A hardness of 22.5 measured on pins of 6 mm thickness at 23° C. and 50% relative humidity prepared by additive manufacturing with support (on top and below) of 6 mm thickness.

Example 2

Support Material Composition for 3D Printing

A support material composition comprising 10 wt. % of nanoclay and 15 wt. % of poloxamer in water is prepared as follows: 200 g of Pluronic 127 are added over 15 minutes to 1000 g of demineralized water in a 3 L reactor having central stirring means. After 30 minutes of stirring at 800 r/min, 0.4 g of Silcolapse RG11 are added as a dispersing agent. Then, 135 g of Laponite are added to the reactor over 15 minutes, followed by 3 drops of blue food colouring. The resulting mixture is mixed 3 times using a speed mixer at room temperature, each cycle having the following parameters: 10 s at 1,000 r/min, 10 s at 2,000 r/min; and finally 30 seconds at 2,750 r/min.

The resulting support material composition is then put in a cartridge and used for the 3D-printing.

Properties of the Support Material Compositions

The viscosity of the obtained composition has been determined at different shear rates at 25° C. and 80° C., using a Haake MARS III rheometer (cone-plate of 2° and diameter of 20 mm at 25° C., GAP=100 μm). The results are presented in Table 3 and compared to the ones obtained with the support material composition of Example 1 having 10% of Laponite.

TABLE 3 viscosities (in Pa.s) of the support material compositions in function of the shear rate applied

| Shear Rate ($s^{-1}$) | 10 wt. % Laponite at 25° C. (Example 1) | 10 wt. % Laponite and 15% Pluronic 127 at 25° C. | 10 wt. % Laponite and 15% Pluronic 127 at 80° C. |
|---|---|---|---|
| 0.01 $s^{-1}$ | 79646 | 33030 | 248800 |
| 0.1 $s^{-1}$ | 9251 | 12050 | 2768 |
| 1 $s^{-1}$ | 1074 | 2091 | 320 |

TABLE 3-continued viscosities (in Pa.s) of the support material compositions
in function of the shear rate applied

| Shear Rate ($s^{-1}$) | 10 wt. % Laponite at 25° C. (Example 1) | 10 wt. % Laponite and 15% Pluronic 127 at 25° C. | 10 wt. % Laponite and 15% Pluronic 127 at 80° C. |
|---|---|---|---|
| 10 $s^{-1}$ | 125 | 200 | 59 |
| 20 $s^{-1}$ | 65 | 87 | 40 |

When no or low shear rate is applied, the compositions have a high viscosity (more than 500 Pa·s), the compositions are thus in a gel state. Furthermore, when a high shear rate is applied, the viscosities of the compositions are greatly lowered and drop below 500 Pa·s. The compositions are then in a liquid state and can therefore be used for the printing of the support. These results also show that it is possible to use the support material composition according to the invention to print at high temperature, for example at a temperature comprised between 25 and 90° C.

The viscosity of the support material composition have also been measured at very low shear rate (0.05, 0.01 and 0.001 $s^{-1}$) at 25° C. and 80° C., after having sheared the composition for 90 s at 20 $s^{-1}$. The results are presented in table 4 and compared to the ones obtained with the support material composition of Example 1 having 10% of Laponite.

TABLE 4

Viscosities (in Pa.s) of the support material compositions after
having sheared the compositions for 90 s at 20 $s^{-1}$.

| Shear Rate ($s^{-1}$) | 10 wt. % Laponite at 25° C. (Example 1) | 10 wt. % Laponite and 15% Pluronic 127 at 25° C. | 10 wt. % Laponite and 15% Pluronic 127 at 80° C. |
|---|---|---|---|
| 0.05 $s^{-1}$ | 17686 | 15300 | 43530 |
| 0.01 $s^{-1}$ | 79646 | 75160 | 124300 |
| 0.001 $s^{-1}$ | 784100 | 121700 | 157800 |

These results show that the viscosities of the different support material compositions increase rapidly after stopping the shear stress. Thus, the support material compositions have properties suitable for the 3D printing of a silicone elastomer article.

3D-Printing

The 3D printing has been done using a Delta Tower 3D printer comprising a 1-component Viscotec dosage system for the support and a 2-component Viscotec dosage system equipped with a static mixer for the 2K silicone composition.

LSR Composition 1

The cartridge comprising the support material composition having 10 wt. % of nanoclay and 15 wt. % of poloxamer is installed on the 1-component Viscotec dosage system with a static pressure of 1 bar and a nozzle of 500 μm.

Part A and part B of the LSR composition 1 are each put in a cartridge adapted to the 2-component Viscotec dosage system and put under 3 bars of pressure. The mixture of part A and part B of the LSR composition 1 in a 50/50 ratio is performed using a static mixer of 16 stages attached to a nozzle of 500 μm.

A supported letter H is then printed with a speed of 10 mm/s. The print heads successively printed each layer of support composition material and each layer of silicone composition.

The crosslinkable silicone composition precursor of the silicone elastomer article is crosslinked at 80° C. for 2 hours in a humidity controlled oven. The support material did not adhere to the silicone elastomer article and was easily removed by washing.

Example 3

A support material composition comprising 10 wt. % of Hatorite in water is prepared according to example 1, using 20 g of Hatorite and 180 g of demineralized water.

Properties of the Support Material Compositions

The viscosity of the obtained composition has been determined at different shear rates at 25° C. and 80° C., using a Haake MARS III rheometer (cone-plate of 2° and diameter of 20 mm at 25° C., GAP=100 μm). The results are presented in Table 5 and compared to the ones obtained with the support material composition of Example 1 having 10% of Laponite.

TABLE 5 viscosities (in Pa.s) of the support material
compositions in function of the shear rate applied

| Shear Rate ($s^{-1}$) | 10 wt. % Laponite at 25° C. (Example 1) | 10 wt. % Hatorite at 25° C. |
|---|---|---|
| 0.01 $s^{-1}$ | 79646 | 58156 |
| 0.1 $s^{-1}$ | 9251 | 7701 |
| 1 $s^{-1}$ | 1074 | 1020 |
| 10 $s^{-1}$ | 125 | 135 |
| 20 $s^{-1}$ | 65 | 73 |

The results obtained are comparable. When no or low shear rate is applied, the compositions have a high viscosity (more than 500 Pa·s), the compositions are thus in a gel state. Furthermore, when a high shear rate is applied, the viscosities of the compositions are greatly lowered and drop below 500 Pa·s. The compositions are then in a liquid state and can therefore be used for the printing of the support.

The viscosity of the support material composition have also been measured at different shear rates (20, 10, 1, 0.1, and 0.01 $s^{-1}$) at 25° C., after having sheared the composition for 90 s at 20 $s^{-1}$. The results are presented in table 6 and compared to the ones obtained with the support material composition of Example 1 having 10% of Laponite.

TABLE 6 viscosities (in Pa.s) of the support material compositions after having sheared the compositions for 90 s at 20 s$^{-1}$.

| Shear Rate (s$^{-1}$) | 10 wt. % Laponite at 25° C. (Example 1) | 10 wt. % Hatorite at 25° C. |
| --- | --- | --- |
| 0.01 s$^{-1}$ | 118400 | 116826 |
| 0.1 s$^{-1}$ | 12330 | 11845 |
| 1 s$^{-1}$ | 1114 | 1201 |
| 10 s$^{-1}$ | 112 | 121 |
| 20 s$^{-1}$ | 70 | 61 |

These results show that the viscosities of the different support material compositions increase rapidly after stopping the shear stress. Thus, the support material compositions have properties suitable for the 3D printing of a silicone elastomer article.

The invention claimed is:

1. A method for additive manufacturing of a silicone elastomer article and a support using a 3D printer, selected from an extrusion 3D printer and a 3D jetting printer, said method comprising:
   1) printing at least one part of the support with a support material composition V;
   2) Printing at least one part of a crosslinkable silicone composition X precursor of the silicone elastomer article;
   steps-1) and 2) being done simultaneously or successively, and when 1) and 2) are done successively, 1) can be performed before 2), or 2) can be performed before 1);
   3) optionally repeating 1) and/or 2); and
   4) allowing the crosslinkable silicone composition X precursor of the silicone elastomer article to crosslink, to obtain a silicone elastomer article;
   wherein said support material composition V comprises:
      between 3 wt. % and 30 wt. % of at least one nanoclay, and
      at least 50 wt. % of water.

2. The method according to claim 1, wherein the support material composition V has a viscosity less than or equal to 500 Pa·s at a shear rate of 10 s$^{-1}$, and a viscosity more than or equal to 500 Pa·s at a shear rate of 0.01 s$^{-1}$.

3. The method according to claim 1, wherein the support material composition V comprises between 3 and 16 wt. % of at least one nanoclay.

4. The method according to claim 1, wherein the nanoclay is selected from the group consisting of:
   kaolin-serpentines
   smectites;
   bentonites; and
   mixtures thereof.

5. The method according to claim 1, wherein the nanoclay is a smectites selected from the group consisting of saponite, hectorite, sauconite, stevensite, swinefordite, montmorillonite, beidellite, nontronite, volkonskoite fluorohactite, laponite and mixtures thereof.

6. The method according to claim 1, wherein the support material composition further comprises at least one additive selected from the group consisting of:
   rheology additive,
   coloration agents;
   pH adjusters;
   antimicrobial agents;
   dispersing agents,
   and mixtures thereof.

7. The method according to claim 1, wherein said support material composition V further comprises:
   between 1 and 20% of a hydrosoluble or hydrodispersible polymer, and.

8. The method according to claim 1, wherein the 3D printer is an extrusion 3D printer.

9. The method according to claim 1, wherein the crosslinkable silicone composition X is crosslinkable via polyaddition reaction or via polycondensation reaction.

10. The method according to claim 1, wherein the method also comprises removal of the support, mechanically or by dissolution in a solvent.

11. A product comprising a support material composition V comprising:
    between 3 wt. % and 30 wt. % of at least one nanoclay, and
    at least 50 wt. % of water
    for 3D printing of a support.

12. A product comprising a support material composition V comprising:
    between 3 wt. % and 30 wt. % of at least one nanoclay, and
    at least 50 wt. % of water,
    for additive manufacturing of a silicone elastomer article and a support using a 3D printer.

13. The method of claim 1, wherein 4) is done by heating and wherein the water is demineralized or distilled water.

14. The method according to claim 4, wherein the kaolin-serpentines are selected from the group consisting of halloysite and kaolinite.

15. The method according to claim 5, wherein the smectite is selected from the group consisting of montmorillonite, hectorite and laponite.

16. The method according to claim 10, wherein the solvent is water.

17. The method according to claim 12, wherein the 3D printer is an extrusion 3D printer.

* * * * *